United States Patent
Christiansen et al.

[15] 3,648,118

[45] Mar. 7, 1972

[54] ELECTROLYTIC CAPACITOR HAVING A SEAL INCLUDING A HOLLOW PROJECTING TERMINAL

[72] Inventors: Paul J. Christiansen; Robert F. Wallace, both of Indianapolis, Ind.

[73] Assignee: P. R. Mallory & Co. Inc., Indianapolis, Ind.

[22] Filed: Dec. 9, 1968

[21] Appl. No.: 785,022

Related U.S. Application Data

[63] Continuation of Ser. No. 469,109, July 2, 1965, abandoned.

[52] U.S. Cl. ............................... 317/230, 29/570, 317/242
[51] Int. Cl. .................................................... H01g 9/06
[58] Field of Search .................................. 317/230, 231, 233

[56] References Cited

UNITED STATES PATENTS

| | | | |
|---|---|---|---|
| 2,246,933 | 6/1941 | Deeley | 317/230 |
| 2,623,101 | 12/1952 | Kurland et al. | 317/230 |
| 3,255,387 | 6/1966 | Giacomello | 317/230 |
| 3,264,015 | 8/1966 | Mayers | 317/230 X |
| 3,264,708 | 8/1966 | Diggens | 317/230 |
| 3,275,901 | 9/1966 | Merritt et al. | 317/230 |
| 3,307,086 | 2/1967 | Propps | 317/230 |
| 3,199,967 | 8/1965 | Pixley | 174/152.4 X |
| 3,290,561 | 12/1966 | Burnham | 317/230 |
| 2,628,271 | 2/1953 | Brafman | 317/230 |
| 2,851,642 | 9/1958 | Schaeren | 317/230 |
| 3,120,695 | 2/1964 | Burnham | 317/230 |
| 3,205,416 | 9/1965 | Bernard et al. | 317/230 |

*Primary Examiner*—James D. Kallam
*Attorney*—Richard H. Childress and Robert F. Meyer

[57] ABSTRACT

In an electrolytic capacitor, an electrolyte substantially covering a porous film-forming metal anode, a film-forming metal anode riser connected to the anode, a dielectric oxide film formed on the anode and on the anode riser and a sealing means. The sealing means includes an apertured metal body, means substantially closing the aperture, a tube of film-forming metal projecting through the means closing the aperture and a dielectric oxide film formed on at least the inner surface of the tube. The anode riser projects into the tube and the tube is closed so that a selected portion of the inner wall of the tube engages with the anode riser. The remaining inner portion of the wall of the tube is spaced from the anode riser.

10 Claims, 4 Drawing Figures

Patented March 7, 1972

3,648,118

INVENTORS
PAUL J. CHRISTIANSEN
ROBERT F. WALLACE
BY
ATTORNEY

ELECTROLYTIC CAPACITOR HAVING A SEAL INCLUDING A HOLLOW PROJECTING TERMINAL

This is a continuation of Ser. No. 469,109 filed July 2, 1965, now abandoned.

The present invention relates to electrolytic capacitors and more particularly relates to means and methods for sealing electrolytic capacitors.

Electrolytic capacitor assemblies generally comprise a container into which a capacitor section is placed. The container is fitted with some type of end seal so that the electrolyte necessary for the operation of the capacitor is retained therein. Prior art end seals have not been successful in coping with the problem of electrolyte creepage which occurs along the boundaries of the different materials employed in the sealing means.

Prior art end seals have consisted of both glass-to-metal seals and a glass-to-metal seal in conjunction with a gasket of Teflon or an elastomer material. Glass-to-metal seals are concentrically constructed as follows: a central tubular metal eyelet is circumscribed by a glass ring which is sealed thereto, and a metal washer circumscribes the glass ring and is sealed thereto. The anode lead wire is positioned so that it passes through and extends from the metal eyelet. The glass-to-metal seal is positioned in the end of the capacitor can and soldered at its periphery to the can wall. In a tantalum capacitor, the anode lead wire is tantalum which must be butt-welded to a solderable wire. The point of the butt-weld is normally located midway within the metal eyelet of the seal and held in place by solder. When electrolyte creeps along the internal anode lead to the area of the metal eyelet, an electrolyte bridge is formed between the capacitor container and either the eyelet, the solder in the eyelet, the point of the butt-weld, or all three. The bridge results in a large increase in the leakage current which leads to electrical failure of the capacitor in a short time.

A further disadvantage of present seals is that galvanic corrosion takes place between the different metals within the eyelet which results in a build up of gases within the unit and the eventual corrosion of the solder seal or a blowout of the seal from the device.

A number of devices have attempted to prevent this by interposing a single elastomeric gasket or a plurality of gaskets between the anode and the seal to prevent the electrolyte from reaching the seal. However, similar problems of leakage, corrosion and seal blowout have still been encountered.

Therefore, it is an object of the present invention to overcome the foregoing and related disadvantages of the prior art.

It is an object of the present invention to provide a hermetically sealed, liquid electrolyte tantalum capacitor.

It is an object of the present invention to provide a capacitor having a seal capable of withstanding internal pressure.

It is an object of the present invention to provide an electrolytic capacitor having a seal designed to prohibit electrolyte creepage at the interface of the different materials making up the capacitor.

It is an object of the present invention to provide an electrolytic capacitor having a true hermetic seal.

It is an object of the present invention to provide a hermetically sealed electrolytic capacitor wherein a Teflon or elastomer plug between the anode and the seal is not necessary.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking the present invention provides a unique hermetic seal for liquid electrolyte tantalum capacitors which in its preferred embodiment comprises a center, elongated hollow anodized tantalum tube, a glass or ceramic ring sealed to the tantalum tube and an outer stainless steel ring sealed to the glass ring. Prior to assembling the capacitor, the anode lead, which is also anodized tantalum, is positioned in the hollow tantalum tube and the tube is crimped and welded to the riser, thus sealing off the hollow tube and positioning the anode. The seal-anode assembly is positioned in a suitable electrolyte-containing cathode can and the seal is welded thereto. The seal of the present invention eliminates both shunt leakage and corrosion at the positive terminal of the capacitor seal.

Figure 1:
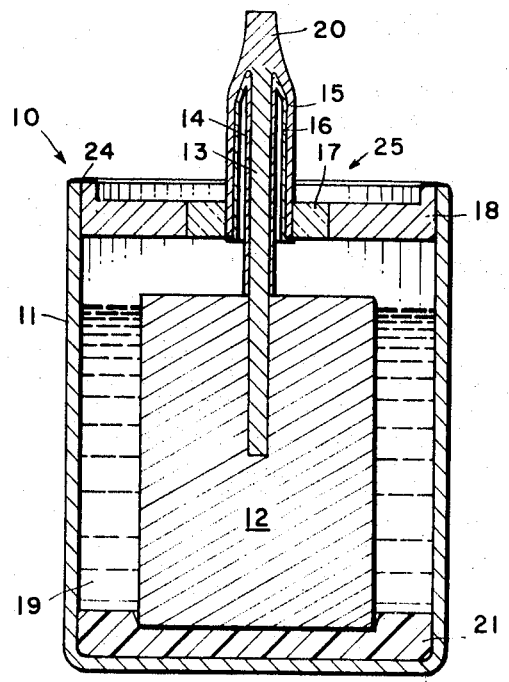
FIG. 1 is a sectional view of a hermetically sealed liquid electrolyte tantalum capacitor showing the novel seal construction prior to final sealing.

For a fuller understanding of the present invention, reference is now made to the drawings. In FIG. 1, the sealed capacitor 10 is shown. Capacitor 10 comprises a noncorrosive metal cathode can 11 having anode spacer 21 positioned therein. The seal unit 25 consists of a center hollow tantalum tube 15 having a tantalum oxide film 16 formed thereon. Glass ring 17 circumscribes and is sealed to tube 15 and a noncorrosive metal ring 18 is sealed to glass ring 17. Thus we have a tantalum-glass-metal seal unit. The metals used in can 11 and ring 18 must be compatible with the entire system, and capable of being welded together.

Prior to assembly, tantalum anode 12 is integrally joined to seal unit 25 by means of tantalum anode riser 13 which also has a tantalum oxide film 14 formed thereon. The anodized riser 13 is positioned within the anodized tube 15, and tube 15 is crimped and welded at point 20. Riser 15 is now an integral part of seal unit 25 and anode 12 is positioned thereby. The seal unit 25 and anode 12 are then positioned within cathode can 11 containing electrolyte 19. Anode spacer 21 is optional, as anode 12 is securely positioned by the crimp and weld 20. Seal unit 25 is then welded to can 11 at points 24, that is, between the can and metal ring 18. Can 11 may be fabricated of noncorrosive materials such as stainless steel, silver, silver-plated stainless steel, silver-clad stainless steel and the like. The noncorrosive material for ring 18 must be capable of being welded to the can 11 and is normally stainless steel.

Figure 2:
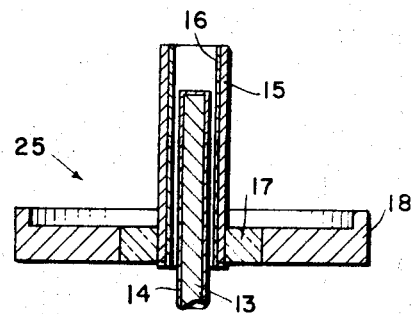
FIG. 2 is a sectional view of the completed seal unit prior to the attachment of an external lead.

FIG. 2 shows seal unit 25 prior to the crimping and welding operations. Anode riser 13 is positioned within hollow tantalum tube 15 prior to the aforementioned operation.

Figure 3:
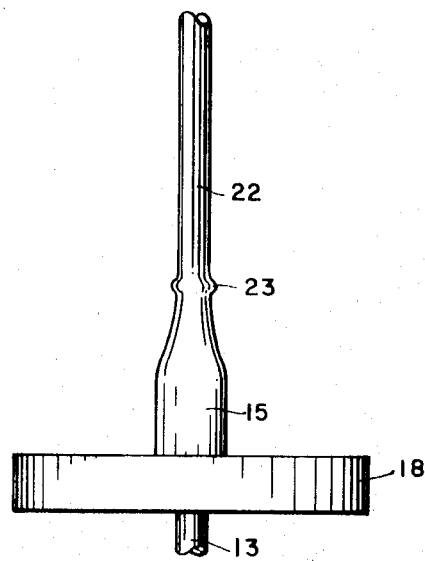
FIG. 3 is a pictorial view of the completed lead assembly.

FIG. 3 depicts the completed lead structure wherein a conductive lead wire 22 is connected to tantalum tube 15 at weld juncture 23.

The resulting capacitor is an improvement over current hermetically sealed liquid electrolyte capacitors having mechanical closures alone or in conjunction with Teflon and elastomer sealing plugs in that the latter are plagued with cell electrolyte leakage problems in the seal area and blowout of the seals.

The capacitor of the present invention further eliminates the internal shunt DC current leakage which occurs in prior art capacitors when the electrolyte reaches the positive terminal of the seal area and forms a conductive path between the cathode can and the positive terminal of the glass-to-metal seal, the lead wire and the solder connecting the lead wire and the anode riser to the center ring. This DC current bypasses the dielectric of the tantalum anode and its riser and in effect forms a direct path from the positive conductive wire to the negative case.

The present invention eliminates the above problem by providing only anodized tantalum in the positive lead-seal area, or in effect provides an extension of the anode. The crimped and welded area seals off the anode riser area so that the electrolyte cannot reach the positive conductive lead wire which is welded to the sealed tantalum tube.

A further disadvantage of prior art capacitors is that the hermetic seal is produced by soldering the glass-to-metal seal to the cathode can. There are a number of problems inherent in using solder. The solder is somewhat porous and the porosity detracts from the overall effectiveness of the seal. Furthermore, to obtain a consistently good solder to base metal bond on a production basis has been a continuing problem in the art. The present invention eliminates the need for solder by welding all seal junctions thereby producing a seal which is neither porous, nor capable of being corroded by electrolyte contact. A wide variety of welding techniques such as electron beam, laser, ultrasonic, heliar, cold, as well as traditional techniques have proved to be excellent for this application.

Figure 4:
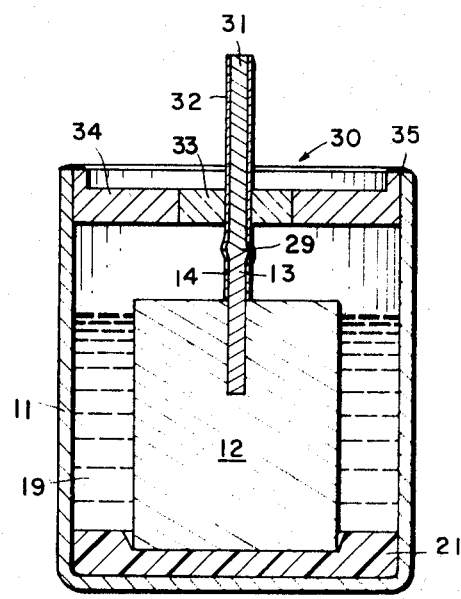
FIG. 4 is a sectional view of a second representative embodiment of the novel hermetic seal.

FIG. 4 represents a second embodiment of the present invention. Seal assembly 30 comprises a solid tantalum wire 31 having an oxide layer 32 formed thereon which is sealed to glass ring 33. Ring 33 is in turn sealed to outer metal ring 34. Prior to the assembling of the capacitor, anode riser 13 is welded to seal wire 31 at a point below the seal. Any resulting defects in the tantalum oxide film resulting from the weld operation are healed by the electrolyte. The seal-anode construction is then positioned in cathode can 11 and welded in place. A conductive lead wire (not shown) is then welded to anodized tantalum wire 31 to complete the capacitor. If the electrolyte does reach the lead area of the seal, it only contacts anodized tantalum and avoids the problem of a DC shunt leakage current.

It is to be understood that the hereinabove disclosed embodiments of the present invention are illustrative and not exhaustive in scope. It will be readily apparent to those skilled in the art that certain variations and modifications may be practiced without departing from the scope of the invention. We consider all of the modifications and variations to be within the foregoing description and defined by the appended claims.

Having thus described our invention, we claim:

1. An electrolytic capacitor comprising:
   a. a metal can which is integral with a cathode portion, said can having at least one open end;
   b. a valve metal anode having a dielectric oxide thereon;
   c. a liquid electrolyte in contact with said anode and said cathode portion;
   d. a valve metal riser having a dielectric oxide thereon affixed to said anode;
   e. a glass or ceramic member sealingly located within said open end, said glass or ceramic member also having an opening therein;
   f. a hollow valve metal member having a dielectric oxide on at least the inside thereof sealingly affixed to the opening in said glass member;
   g. said riser sealingly affixed to at least a portion of the inside of said hollow member; h. said valve metal anode, said valve metal riser and said hollow valve metal member all being made of the same film-forming metal.

2. A capacitor according to claim 1 in which said hollow member is crimped into engagement with said riser.

3. A capacitor according to claim 1 in which said hollow member is crimped and welded to said riser.

4. A capacitor according to claim 1 in which a lead is conductively attached to said hollow member.

5. A capacitor according to claim 1 in which said glass or ceramic member is sealingly affixed to a metal member, which metal member is sealingly affixed to said can.

6. A capacitor according to claim 5 in which said metal member is made of stainless steel.

7. A capacitor according to claim 1 in which a spacer is between said anode and said can.

8. A capacitor according to claim 1 in which said hollow member is spaced from said riser in at least a portion of the distance in which said riser is within the inside of said hollow member.

9. A capacitor according to claim 1 in which said dielectric oxide is an anodized dielectric oxide.

10. A capacitor according to claim 1 in which said valve metal is tantalum.

* * * * *